US010461998B2

(12) United States Patent
Li (10) Patent No.: US 10,461,998 B2
(45) Date of Patent: Oct. 29, 2019

(54) PE DEVICE AND METHOD FOR ADVERTISING INFORMATION ABOUT PE DEVICE (71) Applicant: Huawei Technologies Co., Ltd., Shenzhen (CN)

(72) Inventor: Zhenbin Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 762 days.

(21) Appl. No.: 14/983,153

(22) Filed: Dec. 29, 2015

(65) Prior Publication Data

US 2016/0112255 A1 Apr. 21, 2016

Related U.S. Application Data (63) Continuation of application No. PCT/CN2014/081084, filed on Jun. 30, 2014.

(30) Foreign Application Priority Data

Jun. 29, 2013 (CN) .......................... 2013 1 0270948

(51) Int. Cl.
H04L 12/24 (2006.01)
H04L 12/46 (2006.01)
(Continued)

(52) U.S. Cl.
CPC ...... *H04L 41/0803* (2013.01); *H04L 12/1886* (2013.01); *H04L 12/462* (2013.01);
(Continued)

(58) Field of Classification Search
USPC ....................................................... 709/220
See application file for complete search history.

(56) References Cited

U.S. PATENT DOCUMENTS 7,983,261 B1 * 7/2011 Aggarwal ............... H04L 12/18
370/390
2007/0177550 A1 8/2007 Kwon et al.
(Continued)

FOREIGN PATENT DOCUMENTS

CN 1852236 A 10/2006
CN 101827023 A 9/2010
(Continued)

OTHER PUBLICATIONS

Rosen et al., "Multicast in MPLS/BGP IP VPNs," RFC 6513, pp. 1-88, Internet Engineering Task Force Trust, Reston, Virginia (Feb. 2012).
(Continued)

*Primary Examiner* — Hermon Asres
(74) *Attorney, Agent, or Firm* — Leydig, Voit & Mayer, Ltd.

(57) ABSTRACT

Embodiments of the present application disclose a method for advertising information about a PE device and a related apparatus, which are applied to a BGP-based MVPN. The method includes: a PE device in the MVPN determines a role of the PE device in the MVPN and a working status corresponding to the role, where the role is a root node and/or a leaf node, and the working status is active or standby; the PE device generates a BGP update message, carrying an IP address of the PE device, an identifier of the MVPN, the role of the PE device, and the working status of the PE device; and the PE device sends the BGP update message to a BGP neighbor of the PE device in the MVPN. The method and apparatus may alleviate a configuration workload and reduce an error occurrence during an application of a BGP-based MVPN.

14 Claims, 4 Drawing Sheets (51) Int. Cl.
*H04L 12/751* (2013.01)
*H04L 12/753* (2013.01)
*H04L 12/18* (2006.01)
*H04L 12/721* (2013.01)

(52) U.S. Cl.
CPC ...... *H04L 12/4641* (2013.01); *H04L 12/4675* (2013.01); *H04L 45/02* (2013.01); *H04L 45/48* (2013.01); *H04L 45/66* (2013.01)

(56) References Cited

U.S. PATENT DOCUMENTS

| | | |
|---|---|---|
| 2012/0027013 A1 | 2/2012 | Napierala |
| 2012/0177054 A1* | 7/2012 | Pati ............... H04L 12/4625 370/395.53 |
| 2014/0258485 A1* | 9/2014 | Yang ............... H04L 41/12 709/223 |
| 2014/0301392 A1* | 10/2014 | Jain ............... H04L 12/1886 370/390 |

FOREIGN PATENT DOCUMENTS

| | | |
|---|---|---|
| CN | 101977150 A | 2/2011 |
| CN | 102238028 A | 11/2011 |
| CN | 102238057 A | 11/2011 |

OTHER PUBLICATIONS

Aggarwal et al., "BGP Encodings and Procedures for Multicast in MPLS/BGP IP VPNs," RFC 6514, pp. 1-59, IETF Trust, Reston, Virginia (Feb. 2012).

Li et al., "Role-based State Advertisement for Multicast in MPLS/BGP IP VPNs," Network Working Group, Internet-Draft, pp. 1-7, draft-li-l3vpn-mvpn-role-state-ad-00, IETF Trust, Reston, Virginia (Jul. 15, 2013).

* cited by examiner

PE DEVICE AND METHOD FOR ADVERTISING INFORMATION ABOUT PE DEVICE

CROSS-REFERENCE TO RELATED APPLICATIONS

This application is a continuation of International Patent Application No. PCT/CN2014/081084, filed on Jun. 30, 2014, which claims priority to Chinese Patent Application No. 201310270948.4, filed on Jun. 29, 2013, both of which are hereby incorporated by reference in their entirety.

TECHNICAL FIELD

The present application relates to the field of communications technologies, and in particular, to a Provider Edge (PE) device and a method for advertising information about a PE device.

BACKGROUND

Currently, a Border Gateway Protocol/Multiprotocol Label Switching Layer 3 virtual private network (BGP/MPLS Layer 3 VPN) is widely applied. However, due to rapid development of services such as an Internet Protocol (IP) television (IPTV), a multicast service is in an urgent need of using an existing unicast network architecture to implement multicast data forwarding based on the BGP/MPLS Layer 3 VPN. Based on the foregoing reason, a multicast virtual private network (MVPN) emerges.

A Border Gateway Protocol (BGP)-based MVPN is put forward in the prior art, and is referred to as the BGP-based MVPN in this specification. In the BGP-based MVPN, PE devices are classified into two roles, that is, a root node and a leaf node. A root node refers to a PE device in the MVPN the root node connects to a multicast source and sends multicast data to another PE device. A leaf node refers to a PE device to which a multicast receiver connects. For example, in a BGP-based MVPN, there may be multiple multicast trees, and a PE device may be a root node in multicast tree 1 and a leaf node in multicast tree 2 and multicast tree 3.

In a BGP-based MVPN, when a first PE device needs to know a role of a BGP neighbor and a working status of the BGP neighbor in the same BGP-based MVPN, the role of the BGP neighbor and the working status of the BGP neighbor need to be configured on the first PE device. However, this manual configuration method causes complex network configuration; especially when there are many BGP neighbors of the first PE device in the MVPN, a configuration workload is extremely heavy, and an error is easy to occur.

SUMMARY

Embodiments of the present application provide a method for advertising information about a PE device and a PE device, which are used to resolve problems in the prior art that a configuration workload is heavy and an error is easy to occur during an application of a BGP-based MVPN.

According to a first aspect, an embodiment of the present application provides a method for advertising information about a PE device, which is applied to a BGP-based MVPN and includes:

determining, by a first PE device in the MVPN, a role of the first PE device in the MVPN and a working status corresponding to the role, where the role is a root node and/or a leaf node, and the working status is active or standby;

generating, by the first PE device, a Border Gateway Protocol (BGP) update message, where the BGP update message carries an IP address of the first PE device, an identifier of the MVPN, and the role of the first PE device and the working status of the first PE device; and sending, by the first PE device, the BGP update message to a BGP neighbor of the first PE device in the MVPN.

In a first possible implementation manner of the first aspect, the BGP update message includes network layer reachability information (NLRI), and the NLRI includes a route type field, a route distinguisher (RD) field, an originator IP address field, a root role field, a working status field corresponding to the root role field, a leaf role field, and a working status field corresponding to the leaf role field;

content of the route type field identifies that the BGP update message carries the role of the first PE device and the working status of the first PE device;

the RD field carries an RD of an instance of the MVPN, where the instance of the MVPN is on the first PE device, and the RD is used as the identifier of the MVPN;

the originator IP address field carries the IP address of the first PE device;

when the root role field carries a first value, it identifies that the role of the first PE device is the root node;

when the working status field corresponding to the root role field carries a second value, it identifies that the working status of the first PE device is the active;

when the working status field corresponding to the root role field carries a third value, it identifies that the working status of the first PE device is the standby;

when the leaf role field carries a fourth value, it identifies that the role of the first PE device is the leaf node;

when the working status field corresponding to the leaf role field carries a fifth value, it identifies that the working status of the first PE device is the active; and when the working status field corresponding to the leaf role field carries a sixth value, it identifies that the working status of the first PE device is the standby; where the second value is different from the third value, and the fifth value is different from the sixth value.

With reference to the first possible implementation manner of the first aspect, in a second possible implementation manner of the first aspect, the NLRI further includes a first indication field, and the first indication field is used to indicate whether the NLRI carries a first address field, where the first address field carries an IP address of a second PE device, and the second PE device is an active root node protected by the first PE device in the MVPN;

when the first PE device determines that the role of the first PE device is the root node and the working status of the first PE device is standby, and the first indication field indicates that the NLRI carries the first address field, the NLRI further includes the first address field; correspondingly, the method further includes: determining, by the first PE device, the IP address of the second PE device;

the NLRI further includes a second indication field, and the second indication field is used to indicate whether the NLRI carries a second address field, where the second address field carries an IP address of a third PE device, and the third PE device is an active leaf node protected by the first PE device in the MVPN; and when the first PE device determines that the role of the first PE device is the leaf node and the working status of the first PE device is standby, and the second indication field indicates that the NLRI carries the second address field, the NLRI further includes the second address field; correspondingly, the method further includes: determining, by the first PE device, the IP address of the third PE device.

In a third possible implementation manner of the first aspect, the method further includes: receiving, by the first PE device, a message that carries an S-P-multicast service interface tunnel auto-discovery (S-PMSI A-D) route and is sent from a fourth PE device, where the fourth PE device is a root node in the MVPN;

the BGP update message is used to respond to the message carrying the S-PMSI A-D route, and the BGP update message includes network layer reachability information (NLRI), where the NLRI includes a route type field, a Route Key field, an originator IP address field, and a first working status field;

content of the route type field identifies that the role of the first PE device is the leaf node, and that the BGP update message carries the working status of the first PE device;

the Route Key field carries NLRI in the S-PMSI A-D route;

the originator IP address field carries the IP address of the first PE device;

when the first working status field carries a first value, it identifies that the working status of the first PE device is active; and when the first working status field carries a second value, it identifies that the working status of the first PE device is standby; where the first value is different from the second value.

With reference to the third possible implementation manner of the first aspect, in a fourth possible implementation manner of the first aspect, when the first PE device determines that the role of the first PE device is the leaf node and the working status of the first PE device is standby, the method further includes:

determining, by the first PE device, an IP address of a fifth PE device, where the fifth PE device is an active leaf node protected by the first PE device in the MVPN; and correspondingly, the NLRI further includes a third address field, where the third address field carries the IP address of the fifth PE device.

With reference to the first aspect or any one of the first to the fourth possible implementation manners of the first aspect, in a fifth possible implementation manner of the first aspect, the determining, by a first PE device in the MVPN, a role of the first PE device in the MVPN and a working status corresponding to the role includes:

receiving, by the first PE device, configuration information, where the configuration information is used to specify the role of the first PE device and the working status corresponding to the role; and determining, by the first PE device according to the configuration information, the role of the first PE device and the working status corresponding to the role.

According to a second aspect, an embodiment of the present application provides a first PE device, which is applied to a BGP-based MVPN and includes:

a first determining unit, configured to determine a role of the first PE device in the MVPN and a working status corresponding to the role, where the role is a root node and/or a leaf node, and the working status is active or standby;

a message generating unit, configured to generate a Border Gateway Protocol (BGP) update message, where the BGP update message carries an IP address of the first PE device, an identifier of the MVPN, and the role of the first PE device and the working status of the first PE device and are determined by the first determining unit; and a sending unit, configured to send the BGP update message generated by the message generating unit to a BGP neighbor of the first PE device in the MVPN.

In a first possible implementation manner of the second aspect, the BGP update message includes network layer reachability information (NLRI), and the NLRI includes a route type field, an RD field, an originator IP address field, a root role field, a working status field corresponding to the root role field, a leaf role field, and a working status field corresponding to the leaf role field;

content of the route type field identifies that the BGP update message carries the role of the first PE device and the working status of the first PE device;

the RD field carries an RD of an instance of the MVPN, where the instance of the MVPN is on the first PE device, and the RD is used as the identifier of the MVPN;

the originator IP address field carries the IP address of the first PE device;

when the root role field carries a first value, it identifies that the role of the first PE device is the root node;

when the working status field corresponding to the root role field carries a second value, it identifies that the working status of the first PE device is active;

when the working status field corresponding to the root role field carries a third value, it identifies that the working status of the first PE device is standby;

when the leaf role field carries a fourth value, it identifies that the role of the first PE device is the leaf node;

when the working status field corresponding to the leaf role field carries a fifth value, it identifies that the working status of the first PE device is active; and when the working status field corresponding to the leaf role field carries a sixth value, it identifies that the working status of the first PE device is standby; where the second value is different from the third value, and the fifth value is different from the sixth value.

With reference to the first possible implementation manner of the second aspect, in a second possible implementation manner of the second aspect, the NLRI further includes a first indication field, and the first indication field is used to indicate whether the NLRI carries a first address field, where the first address field carries an IP address of a second PE device, and the second PE device is an active root node protected by the first PE device in the MVPN;

when the first determining unit determines that the role of the first PE device is the root node and the working status of the first PE device is standby, and the first indication field indicates that the NLRI carries the first address field, the NLRI further includes the first address field; correspondingly, the first PE device further includes: a second determining unit, configured to determine the IP address of the second PE device;

the NLRI further includes a second indication field, and the second indication field is used to indicate whether the NLRI carries a second address field, where the second address field carries an IP address of a third PE device, and the third PE device is an active leaf node protected by the first PE device in the MVPN; and when the first determining unit determines that the role of the first PE device is the leaf node and the working status of the first PE device is standby, and the second indication field indicates that the NLRI carries the second address field, the NLRI further includes the second address field; correspondingly, the first PE device further includes: a third determining unit, configured to determine the IP address of the third PE device.

In a third possible implementation manner of the second aspect, the first PE device further includes: a receiving unit, configured to receive a message that carries an S-PMSI A-D route and is sent from a fourth PE device, where the fourth PE device is a root node in the MVPN;

the BGP update message is used to respond to the message carrying the S-PMSI A-D route, and the BGP update message includes network layer reachability information (NLRI), where the NLRI includes a route type field, a Route Key field, an originator IP address field, and a first working status field;

content of the route type field identifies that the role of the first PE device is the leaf node, and that the BGP update message carries the working status of the first PE device;

the Route Key field carries NLRI in the S-PMSI A-D route;

the originator IP address field carries the IP address of the first PE device;

when the first working status field carries a first value, it identifies that the working status of the first PE device is active; and when the first working status field carries a second value, it identifies that the working status of the first PE device is standby; where the first value is different from the second value.

With reference to the third possible implementation manner of the second aspect, in a fourth possible implementation manner of the second aspect, the first PE device further includes: a fourth determining unit, configured to: when the first determining unit determines that the role of the first PE device is the leaf node and the working status of the first PE device is standby, determine an IP address of a fifth PE device, where the fifth PE device is an active leaf node protected by the first PE device in the MVPN; correspondingly, the NLRI further includes a third address field, where the third address field carries the IP address of the fifth PE device.

With reference to the second aspect or any one of the first to the fourth possible implementation manners of the second aspect, in a fifth possible implementation manner of the second aspect, the first determining unit includes:

a configuration receiving subunit, configured to receive configuration information, where the configuration information is used to specify the role of the first PE device and the working status corresponding to the role; and a determining subunit, configured to determine, according to the configuration information received by the configuration receiving subunit, the role of the first PE device and the working status corresponding to the role.

According to the method for advertising information about a PE device and the PE device that are provided in the embodiments of the present application, a PE device in a BGP-based MVPN determines a role of the PE device in the BGP-based MVPN and a working status corresponding to the role, generates a BGP update message, and sends the BGP update message to a BGP neighbor of the PE device in the BGP-based MVPN, where the BGP update message carries an IP address of the PE device, an identifier of the MVPN, the role of the PE device, and the working status corresponding to the role, which may enable the BGP neighbor of the PE device in the same MVPN to automatically obtain the role of the PE device and the working status of the PE device, so that a configuration workload of the MVPN may be lessened and errors may be reduced.

DESCRIPTION OF EMBODIMENTS

The following further describes in detail the technical solutions in embodiments of the present application with reference to accompanying drawings and embodiments.

Figure 1:
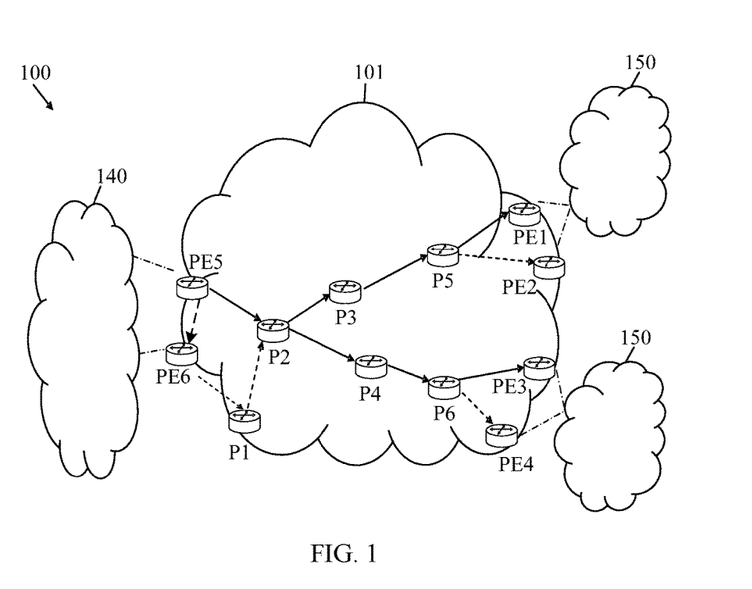
FIG. 1 is a schematic networking diagram of a BGP-based MVPN.

FIG. 1 is a schematic networking diagram of a BGP-based MVPN. For example, a first network 100 shown in FIG. 1 includes a second network 140, a third network 101, and a fourth network 150, where the second network 140 is a network in which a multicast source is located. The third network 101 is a label switching network and runs a BGP-based MVPN protocol. The fourth network 150 is a network in which a multicast receiver is located. For example, one of MVPNs included in the third network 101 is referred to as MVPN A. In MVPN A, multicast tree 1 with PE5 as an active root node needs to be established by using a point to multi-point (P2MP) tunnel. PE6 is a standby root node of multicast tree 1; PE1 and PE3 are active leaf nodes of multicast tree 1; and PE2 and PE4 are standby leaf nodes of multicast tree 1. As shown in FIG. 1, an active P2MP tunnel is indicated by a solid line, and a standby P2MP tunnel is indicated by a dashed line. In the prior art, before establishing active and standby tunnels shown in FIG. 1, a network administrator needs to configure PE devices. PE5 is used as an example. In addition to that PE5 is configured to be an active root node of MVPN A, a role of another PE device and a working status of the another PE device also need to be configured on PE5. For example, PE6 is configured to be a standby root node of MVPN A; PE1 and PE3 are configured to be active leaf nodes of MVPN A; PE2 and PE4 are configured to be standby leaf nodes of MVPN A. The embodiment of the present application provides a method for automatically advertising information about a PE device, which may lessen configuration workloads on PE devices, and reduce errors.

Figure 2:
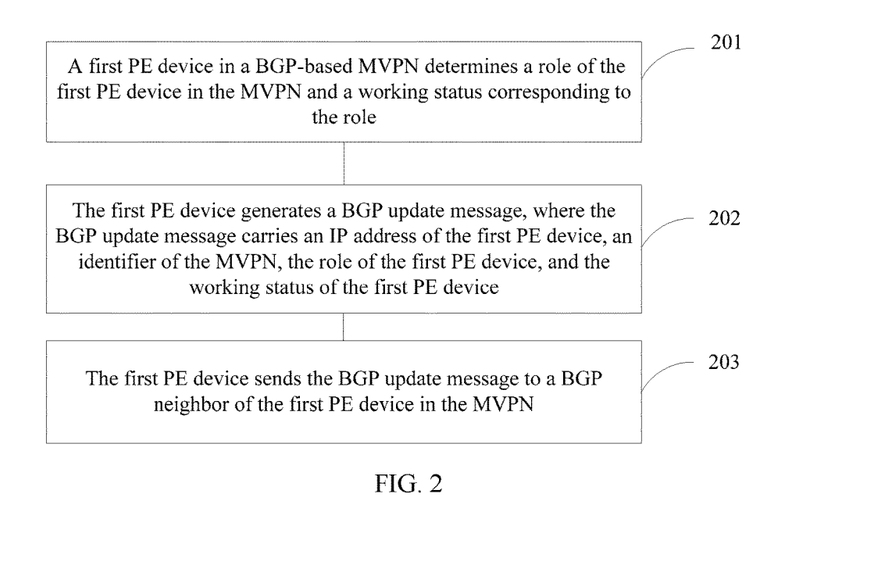
FIG. 2 is a flowchart of a method for advertising information about a PE device according to an embodiment of the present application.

As shown in FIG. 2, the embodiment of the present application provides a method for advertising information about a PE device, the method is applied to a BGP-based MVPN and includes:

201. A first PE device in the MVPN determines a role of the first PE device in the MVPN and a working status corresponding to the role, where the role is a root node and/or a leaf node, and the working status is active or standby.

For example, the first PE device may determine the role of the first PE device in the MVPN and the working status corresponding to the role by reading configuration information, where the configuration information may be configured on the first PE device by a network administrator by using a network management system. For example, with reference to FIG. 1, the network administrator delivers a configuration command to each of PE1, PE2, PE3, PE4, PE5, and PE6 in MVPN A to specify roles of the six PE devices in MVPN A and working statuses corresponding to the roles. The network administrator may deliver the following configuration commands by using the network management system:

a configuration command delivered to PE5, where the configuration command specifies that PE5 is an active root node in MVPN A;

a configuration command delivered to PE6, where the configuration command specifies that PE6 is a standby root node in MVPN A;

a configuration command delivered to PE1, where the configuration command specifies that PE1 is an active leaf node in MVPN A;

a configuration command delivered to PE2, where the configuration command specifies that PE2 is a standby leaf node in MVPN A;

a configuration command delivered to PE3, where the configuration command specifies that PE3 is an active leaf node in MVPN A; and a configuration command delivered to PE4, where the configuration command specifies that PE4 is a standby leaf node in MVPN A.

After receiving the foregoing configuration commands, PE1-PE6 determine the roles of PE1-PE6 and the working statuses of PE1-PE6.

For another example, the network administrator configures roles of PE1-PE6 by using configuration commands, and working statuses of PE1-PE6 are determined by using the Virtual Router Redundancy Protocol (VRRP). For example, a VRRP protection group may be formed between PE1 and PE2 in MVPN A by running VRRP, and an active/standby relationship is automatically negotiated and determined according to a result of running VRRP. Likewise, an active/standby relationship between PE5 and PE6 and that between PE3 and PE 4 in MVPN A may also be separately and automatically negotiated and determined in a VRRP manner. For another example, working statuses of PE1-PE6 are determined by using the Inter-Chassis Communication Protocol (ICCP). For example, active/standby relationships may be automatically negotiated and determined by running the ICCP between PE1 and PE2, between PE5 and PE6, and between PE3 and PE 4 in MVPN A.

202. The first PE device generates a BGP update message, where the BGP update message carries an IP address of the first PE device, an identifier of the MVPN, the role of the first PE device, and the working status of the first PE device.

For example, the BGP update message may be actively generated by the first PE device after the first PE device determines the role of the first PE device and the working status of the first PE device, which is hereinafter referred to as manner 1; or the BGP update message may be a response message generated by the first PE device after the first PE device receives a message that carries an S-PMSI A-D route and is sent from a PE device serving as a root node in MVPN A and then processes the message carrying the S-PMSI A-D route, which is hereinafter referred to as manner 2. In manner 2, the first PE device determines that the first PE device is a leaf node in MVPN A. A BGP update message in a BGP-based MVPN protocol includes NLRI, which is referred to as NLRI of a multicast VPN (MCAST-VPN NLRI), whose format is shown in Table 1.

TABLE 1

MCAST-VPN NLRI in the BGP-based MVPN Protocol

```
+------------------------------------------------+
|   Route Type (1 octet)                         |
+------------------------------------------------+
|   Length (1 octet)                             |
+------------------------------------------------+
|  Route Type specific (variable)                |
+------------------------------------------------+
```

The following separately introduces manner 1 and manner 2 in detail. For ease of description, in this specification, a BGP update message in manner 1 is referred to as BGP update message A, and a BGP update message in manner 2 is referred to as BGP update message B. NLRI in BGP update message A and that in BGP update message B is respectively referred to as NLRI A and NLRI B.

Manner 1:

In manner 1, a new value may be defined for a route type (Route Type) field in NLRI A, to distinguish from a route type that already exists in the BGP-based MVPN protocol (such as RFC 6514). Content of the route type field identifies that BGP update message A carries the role of the first PE device and the working status of the first PE device.

For example, a route type specific (Route Type specific) field in NLRI A may be in a format shown in Table 2, and the route type specific (Route Type specific) field in NLRI A includes an RD field, an originator IP address field (Originating Router's IP Addr), a root role field (R), a working status field (S that follows the R field) corresponding to the root role field, a leaf role field (L), and a working status field (S that follows the L field) corresponding to the leaf role field.

TABLE 2

First Type of Route Type specific in NLRI A

```
+------------------------------------------------+
|   RD (8 octets)                                |
+------------------------------------------------+
|   Originating Router's IP Addr                 |
+------------------------------------------------+
| R|S|E|L|S|E|   Reserved                        |
+------------------------------------------------+
|  Protected Root's IP Addr(Optional)            |
+------------------------------------------------+
|  Protected Leaf's IP Addr(Optional)            |
+------------------------------------------------+
```

The RD field carries an RD of an instance of the MVPN, where the instance of the MVPN is on the first PE device, and the RD is used as the identifier of the MVPN. For example, the RD is used as an identifier of MVPN A.

The originator IP address field carries the IP address of the first PE device.

When a value of the root role field is a first value, for example, 1, it identifies that the role of the first PE device in MVPN A is a root node.

A value of the working status field corresponding to the root role field identifies whether the working status of the first PE device is active or standby. For example, when the value of the working status field corresponding to the root role field is a second value, for example, 1, it identifies that the working status of the first PE device is active; when the value of the working status field corresponding to the root role field is a third value, for example, 0, it identifies that the working status of the first PE device is standby. The second value is different from the third value.

When a value of the leaf role field is a fourth value, for example, 1, it identifies that the role of the first PE device in MVPN A is a leaf node.

A value of the working status field corresponding to the leaf role field identifies whether the working status of the first PE device is active or standby. For example, when the value of the working status field corresponding to the leaf role field is a fifth value, for example, 1, it identifies that the working status of the first PE device is active; when the value of the working status field corresponding to the leaf role field is a sixth value, for example, 0, it identifies that the working status of the first PE device is standby. The fifth value is different from the sixth value.

For example, if values of the four fields R, S, L, and S are respectively 1, 1, 0, and 0, it identifies that the first PE is an active root node; if values of the four fields R, S, L, and S are respectively 1, 1, 1, and 1, it identifies that the first PE is an active root node and an active leaf node; if values of the four fields R, S, L, and S are respectively 1, 0, 1, and 1, it identifies that the first PE device is a standby root node and an active leaf node.

In manner 1, optionally, NLRI A further includes a first indication field (the first E field after R in Table 2) and a second indication field (the second E field after the R field in Table 2). The first indication field is used to indicate whether NLRI A carries a first address field (the Protected Root's IP Addr(Optional) field in Table 2), where the first address field carries an IP address of a second PE device, and the second PE device is an active root node protected by the first PE device in the MVPN. The second indication field is used to indicate whether NLRI A carries a second address field (the Protected Leafs IP Addr(Optional) field in Table 2), where the second address field carries an IP address of a third PE device, and the third PE device is an active leaf node protected by the first PE device in the MVPN. When the first PE device determines that the role of the first PE device is the root node and the working status of the first PE device is standby, and the first indication field indicates that the NLRI carries the first address field, the NLRI further includes the first address field; correspondingly, the method further includes: determining, by the first PE device, the IP address of the second PE device. When the first PE device determines that the role of the first PE device is the leaf node and the working status of the first PE device is standby, and the second indication field indicates that the NLRI carries the second address field, the NLRI further includes the second address field; correspondingly, the method further includes: determining, by the first PE device, the IP address of the third PE device.

In this way, it may be flexibly specified, by using the first indication field and the second indication field, whether NLRI A further carries the active root node and/or the active leaf node that is protected by the first PE device. In addition, space occupied by NLRI A may be reduced.

For example, when a value of the first indication field is 1, it indicates that NLRI A carries the first address field; when the value of the first indication field is 0, it indicates that NLRI A does not carry the first address field. Similarly, when a value of the second indication field is 1, it indicates that NLRI A carries the second address field; when the value of the second indication field is 0, it indicates that NLRI A does not carry the second address field. The foregoing 1 and 0 are merely value examples, and do not constitute a limitation.

For ease of understanding, for example, if values of the six fields R, S, E, L, S, and E in NLRI A are respectively 1, 0, 1, 1, 0, and 1, it identifies that the first PE is a standby root node and a standby leaf node, and NLRI A carries an IP address of the active root node and an IP address of the active leaf node, where the active root node and the active leaf node are protected by the first PE device; if values of the six fields R, S, E, L, S, and E in NLRI A are respectively 1, 0, 1, 1, 0, and 0, it identifies that the first PE is a standby root node and a standby leaf node, and NLRI A only carries an IP address of the active root node protected by the first PE device; if values of the six fields R, S, E, L, S, and E in NLRI A are respectively 1, 0, 0, 1, 0, and 0, it identifies that the first PE is a standby root node and a standby leaf node, and NLRI A carries neither an IP address of the active root node nor an IP address of the active leaf node, where the active root node and the active leaf node are protected by the first PE device.

For example, the first PE device determines an IP address of the second PE device and an IP address of the third PE device, the IP address of the second PE device and the IP address of the third PE device may be obtained by reading a configuration command delivered by the network administrator. For example, in FIG. 1, that the first PE device is PE6 is used as an example, and PE6 is a standby root node. The network administrator may further deliver a configuration command to PE6 to configure an IP address of an active root node protected by PE6, that is, an IP address of PE5. After PE6 receives the configuration command, PE6 determines the IP address of the active root node protected by PE6, that is, the IP address of PE5.

In manner 1, optionally, when the working status of the first PE device is the standby in the MVPN, there is another manner of indicating whether NLRI A carries an IP address of an active root node protected by the first PE device, as shown in Table 3. The first indication field and the second indication field in Table 2 do not exist in Table 3. In Table 3, whether NLRI A carries the IP address of the active root node protected by the first PE device is identified by using values of a third address field (a Protected Root's IP Addr field) and a fourth address field (a Protected Root's IP Addr field). For example, when a value of a fifth address field (a Protected Root's IP Addr field) in Table 3 is a specific value (the specific value is not a normal IP address), for example, 0, it identifies that NLRI A does not carry an IP address of an active root node protected by the first PE device; when the value of the fifth address field in Table 3 is D1 (D1 is a normal IP address), it identifies that an IP address of an active root node protected by the first PE device is D1. When a value of a sixth address field (a Protected Leafs IP Addr field) in Table 3 is a specific value (the specific value is not a normal IP address), for example, 0, it identifies that NLRI A does not carry an IP address of an active leaf node protected by the first PE device; when the value of the sixth address field in Table 3 is D2 (D2 is a normal IP address), it identifies that an IP address of an active leaf node protected by the first PE device is D2.

TABLE 3

Second Type of Route Type specific in NLRI A

```
+------------------------------------------------+
|  RD (8 octets)                                 |
+------------------------------------------------+
|  Originating Router's IP Addr                  |
+------------------------------------------------+
| R|S|L|S|   Reserved                            |
+------------------------------------------------+
| Protected Root's IP Addr                       |
+------------------------------------------------+
| Protected Leaf's IP Addr                       |
+------------------------------------------------+
```

Manner 2:

The first PE device receives a message that carries an S-PMSI A-D route and is sent from a fourth PE device, where the fourth PE device is a root node in the MVPN. If the first PE device determines that the first PE device is a leaf node, the first PE device may send a BGP update message B to respond to a message carrying an S-PMSI A-D route. For example, in FIG. 1, that the first PE device is PE1 and the fourth PE device is PE5 is used as an example. The root node PE5 in MVPN A may send a message carrying an S-PMSI A-D route in MVPN A, where the message carries a specific multicast source and a specific multicast group. If PE1 chooses to join the specific multicast source and the specific multicast group, PE1 may generate BGP update message B for response.

For example, a new value may be defined for a route type (Route Type) field in NLRI B, to distinguish from a route type that already exists in the BGP-based MVPN protocol (such as RFC 6514); and the value is also different from a route type in NLRI A. Content of the route type field in NLRI B identifies that the role of the first PE device is a leaf node, and BGP update message B carries the working status of the first PE device.

A route type specific (Route Type specific) field in NLRI B may be in a format shown in Table 4, and includes a Route Key field, an originator IP address field, and a first working status field (S).

TABLE 4

Route Type specific in NLRI B

```
+------------------------------------------------------------+
|   Route Key (variable)                                     |
+------------------------------------------------------------+
|   Originating Router's IP Addr                             |
+------------------------------------------------------------+
|S|        Reserved                                          |
+------------------------------------------------------------+
| Protected Leaf's IP Addr(optional)                         |
+------------------------------------------------------------+
```

The Route Key field carries NLRI in the S-PMSI A-D route. The NLRI in the S-PMSI A-D route includes an RD field, whose meaning is the same as a meaning of the RD field in Table 2.

The originator IP address field carries the IP address of the first PE device.

The first working status field is used to identify whether the working status of the first PE device is active or standby. For example, when a value of the first working status field is a first value, for example, 1, it identifies active; when the value of the first working status field is a second value, for example, 0, it identifies standby. The first value is different from the second value.

In manner 2, optionally, if the first PE device determines that the role of the first PE device is the leaf node and the working status of the first PE device is standby, the first PE device further determines an IP address of a fifth PE device, where the fifth PE device is an active leaf node protected by the first PE device in the MVPN. Correspondingly, a packet format shown in Table 4 further includes a third address field (Protected Leafs IP Addr(Optional)), which identifies an IP address of the active leaf node protected by the first PE. For example, in FIG. 1, that the first PE device is PE2 is used as an example. After PE2 determines that PE2 is a standby leaf node, PE2 further determines an IP address of an active leaf node protected by PE2, that is, PE1; correspondingly, a value of the third address field shown in Table 4 is the IP address of PE1.

It should be understood that, in a specific configuration command design, there may be multiple configuration commands or there may be multiple parameters of one configuration command for configuring a role of a PE and a working status of the PE and an IP address of an active node protected by the PE, which is not limited herein.

203. The first PE device sends the BGP update message to a BGP neighbor of the first PE device in the MVPN.

Generally, in the BGP-based MVPN, a BGP peer is established between PE devices, thereby establishing a BGP neighbor. Generally, a BGP peer is established between PE devices in a full-mesh manner.

In FIG. 1, it is assumed that a BGP neighbor is established between all the PE devices in FIG. 1; then, PE2 is used as an example. After PE2 performs the foregoing 203, PE1, PE3, PE4, PE5, and PE6 each receive a BGP update message sent from PE2, and therefore learn that PE2 is a standby leaf node. If the BGP update message further carries an IP address of PE1 protected by PE2, PE1, PE3, PE4, PE5, and PE6 further learn that an active leaf node protected by PE2 is PE1.

According to the method for advertising information about a PE device that is provided in this embodiment of the present application, a PE device in a BGP-based MVPN determines a role of the PE device in the BGP-based MVPN and a working status corresponding to the role, generates a BGP update message, and sends the BGP update message to a BGP neighbor of the PE device in the BGP-based MVPN, where the BGP update message carries an IP address of the PE device, an identifier of the MVPN, the role of the PE device, and the working status corresponding to the role, which may enable the BGP neighbor of the PE device in the same MVPN to automatically obtain the role of the PE device and the working status of the PE device, so that a configuration workload of the MVPN may be lessened and errors may be reduced.

Further, the method provided in this embodiment of the present application overcomes a deficiency that in an existing BGP-based MVPN protocol, a PE device cannot advertise a working status of the PE device, so that the BGP-based MVPN protocol may be combined with a technology of establishing a P2MP tunnel with local protection, because the technology of establishing a P2MP tunnel with local protection requires that a root node learn an active/standby state of each leaf node. For a method for establishing a P2MP tunnel with local protection, refer to a patent application with a publication number US2010-0177631.

Figure 3:
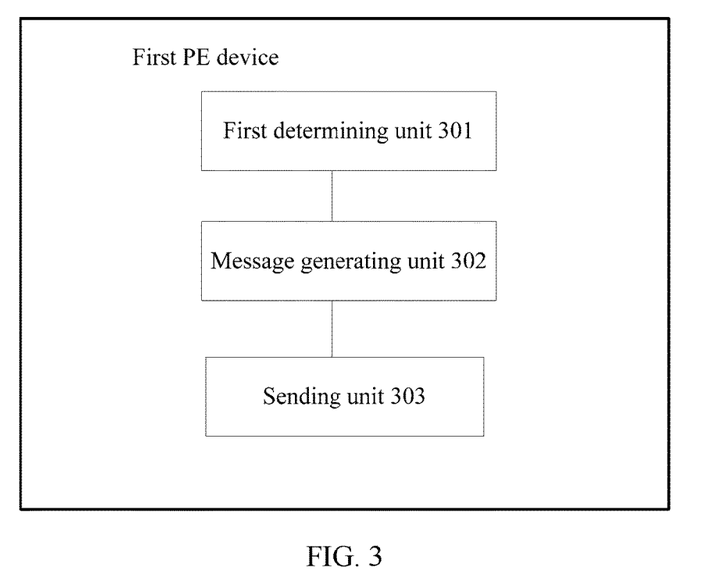
FIG. 3 is a schematic diagram of a first PE device according to an embodiment of the present application.

Referring to FIG. 3, an embodiment of the present application provides a first PE device, which is applied to a BGP-based MVPN and includes:

a first determining unit 301, configured to determine a role of the first PE device in the MVPN and a working status corresponding to the role, where the role is a root node and/or a leaf node, and the working status is active or standby;

a message generating unit 302, configured to generate a BGP update message, where the BGP update message carries an IP address of the first PE device, an identifier of the MVPN, the role of the first PE device, and the working status of the first PE device, where the role of the first PE device and the working status of the first PE device are determined by the first determining unit 301; and a sending unit 303, configured to send the BGP update message generated by the message generating unit 302 to a BGP neighbor of the first PE device in the MVPN.

Optionally, the first determining unit 301 includes:

a configuration receiving subunit, configured to receive configuration information, where the configuration information is used to specify the role of the first PE device and the working status corresponding to the role; and a determining subunit, configured to determine, according to the configuration information received by the configuration receiving subunit, the role of the first PE device and the working status corresponding to the role.

For example, the BGP update message may be actively generated by the first PE device after the first PE device determines the role of the first PE device and the working status of the first PE device, which is hereinafter referred to as manner 1; or the BGP update message may be a response message generated by the first PE device after the first PE device receives a message that carries an S-PMSI A-D route and is sent from a PE device serving as a root node in the MVPN and then processes the message carrying the S-PMSI A-D route, which is hereinafter referred to as manner 2. In manner 2, the first PE device determines that the first PE device is a leaf node in the MVPN. A BGP update message in a BGP-based MVPN protocol includes NLRI, which is referred to as NLRI of a multicast VPN (MCAST-VPN NLRI). For ease of description, in this specification, a BGP update message in manner 1 is referred to as BGP update message A, and a BGP update message in manner 2 is referred to as BGP update message B. NLRI in BGP update message A and that in BGP update message B is respectively referred to as NLRI A and NLRI B.

The following separately describes manner 1 and manner 2.

In manner 1, optionally, NLRI A includes a route type field, an RD field, an originator IP address field, a root role field, a working status field corresponding to the root role field, a leaf role field, and a working status field corresponding to the leaf role field. Content of the route type field in NLRI A identifies that BGP update message A carries the role of the first PE device and the working status of the first PE device; the RD field carries an RD of an instance of the MVPN, where the instance of the MVPN is on the first PE device, and the RD is used as the identifier of the MVPN; the originator IP address field carries the IP address of the first PE device; when the root role field carries a first value, it identifies that the role of the first PE device is the root node; when the working status field corresponding to the root role field carries a second value, it identifies that the working status of the first PE device is the active; when the working status field corresponding to the root role field carries a third value, it identifies that the working status of the first PE device is the standby; when the leaf role field carries a fourth value, it identifies that the role of the first PE device is the leaf node; when the working status field corresponding to the leaf role field carries a fifth value, it identifies that the working status of the first PE device is the active; when the working status field corresponding to the leaf role field carries a sixth value, it identifies that the working status of the first PE device is the standby; where the second value is different from the third value, and the fifth value is different from the sixth value.

Figure 4:
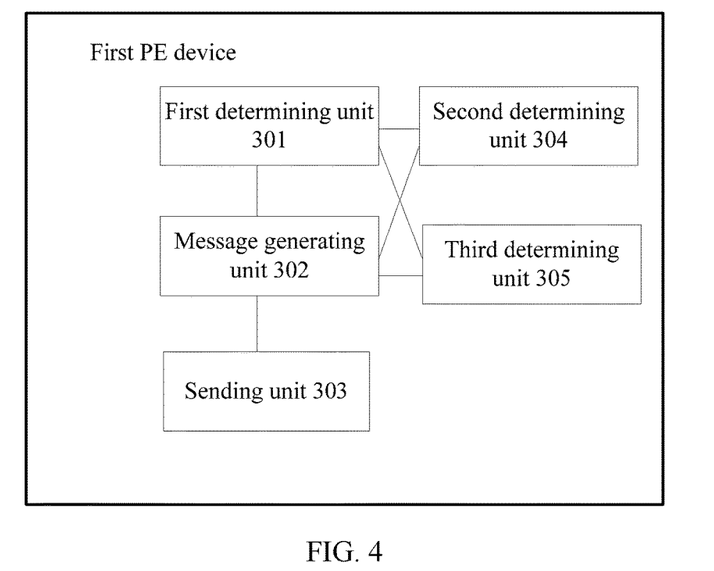
FIG. 4 is a schematic diagram of a first PE device according to an embodiment of the present application.

In manner 1, optionally, the NLRI A further includes a first indication field, and the first indication field is used to indicate whether the NLRI A carries a first address field, where the first address field carries an IP address of a second PE device, and the second PE device is an active root node protected by the first PE device in the MVPN;

when the first determining unit 301 determines that the role of the first PE device is the root node and the working status of the first PE device is standby, and the first indication field indicates that the NLRI A carries the first address field, the NLRI A further includes the first address field; correspondingly, based on FIG. 3, and as shown in FIG. 4, the first PE device further includes: a second determining unit 304, configured to determine the IP address of the second PE device;

the NLRI A further includes a second indication field, and the second indication field is used to indicate whether the NLRI A carries a second address field, where the second address field carries an IP address of a third PE device, and the third PE device is an active leaf node protected by the first PE device in the MVPN; and when the first determining unit 301 determines that the role of the first PE device is the leaf node and the working status of the first PE device is standby, and the second indication field indicates that the NLRI A carries the second address field, the NLRI A further includes the second address field; correspondingly, based on FIG. 3, and as shown in FIG. 4, the first PE device further includes: a third determining unit 305, configured to determine the IP address of the third PE device.

Figure 5:
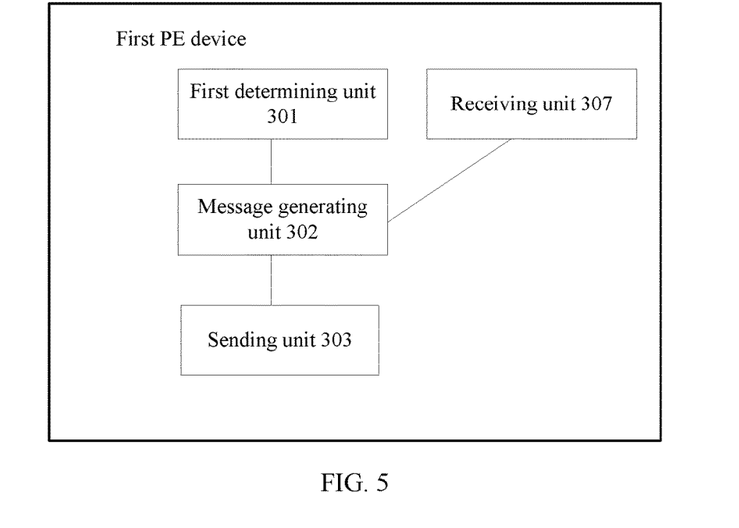
FIG. 5 is a schematic diagram of a first PE device according to an embodiment of the present application.

In manner 2, optionally, based on FIG. 3, and as shown in FIG. 5, the first PE device further includes:

a receiving unit 307, configured to receive a message that carries an S-PMSI A-D route and is sent from a fourth PE device, where the fourth PE device is a root node in the MVPN.

BGP update message B is used to respond to the message carrying the S-PMSI A-D route, and BGP update message B includes NLRI B, where NLRI B includes a route type field, a Route Key field, an originator IP address field, and a first working status field. Content of the route type field in NLRI B identifies that the role of the first PE device is the leaf node, and that the BGP update message B carries the working status of the first PE device; the Route Key field carries NLRI in the S-PMSI A-D route; the originator IP address field carries the IP address of the first PE device; when the first working status field carries a first value, it identifies that the working status of the first PE device is the active; when the first working status field carries a second value, it identifies that the working status of the first PE device is the standby; where the first value is different from the second value.

Figure 6:
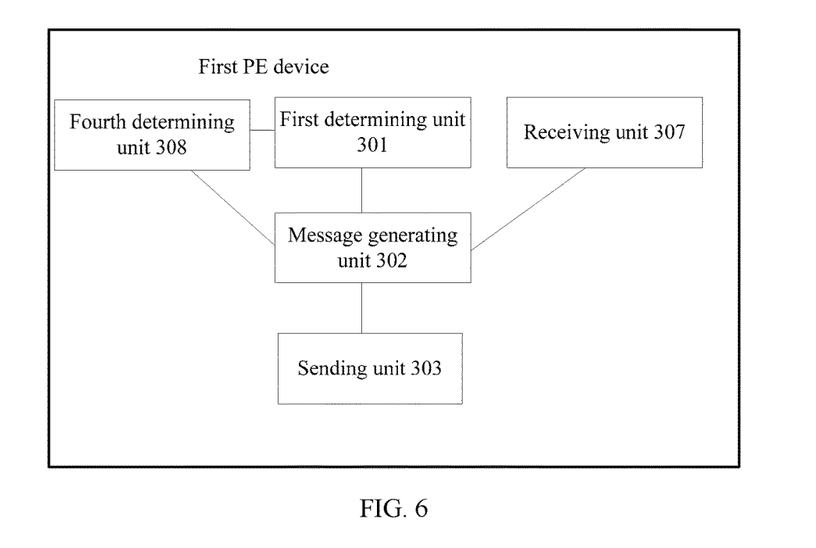
FIG. 6 is a schematic diagram of a first PE device according to an embodiment of the present application.

In manner 2, optionally, based on FIG. 5, and as shown in FIG. 6, the first PE device further includes:

a fourth determining unit 308, configured to: when the first determining unit 301 determines that the role of the first PE device is the leaf node and the working status of the first PE device is standby, determine an IP address of a fifth PE device, where the fifth PE device is an active leaf node protected by the first PE device in the MVPN; correspondingly, NLRI B further includes a third address field, where the third address field carries the IP address of the fifth PE device.

The first PE device shown in the foregoing FIG. 3 to FIG. 6 may perform the method in FIG. 1.

For example, units shown in FIG. 3 to FIG. 6 may be combined into one or more units.

For another example, the units or subunits may all be implemented by using hardware.

According to the technical solution provided in this embodiment of the present application, a PE device in a BGP-based MVPN determines a role of the PE device in the BGP-based MVPN and a working status corresponding to the role, generates a BGP update message, and sends the BGP update message to a BGP neighbor of the PE device in the BGP-based MVPN, where the BGP update message carries an IP address of the PE device, an identifier of the MVPN, the role of the PE device, and the working status corresponding to the role, which may enable the BGP neighbor of the PE device in the same MVPN to automatically obtain the role of the PE device and the working status of the PE device, so that a configuration workload of the MVPN may be lessened and errors may be reduced.

Further, the technical solution provided in this embodiment of the present application overcomes a deficiency that in an existing BGP-based MVPN protocol, a PE device cannot advertise a working status of the PE device, so that the BGP-based MVPN protocol may be combined with a technology of establishing a P2MP tunnel with local protection, because the technology of establishing a P2MP tunnel with local protection requires that a root node learn an active/standby state of each leaf node. For a method for establishing a P2MP tunnel with local protection, refer to a patent application with a publication number US2010-0177631.

Figure 7:
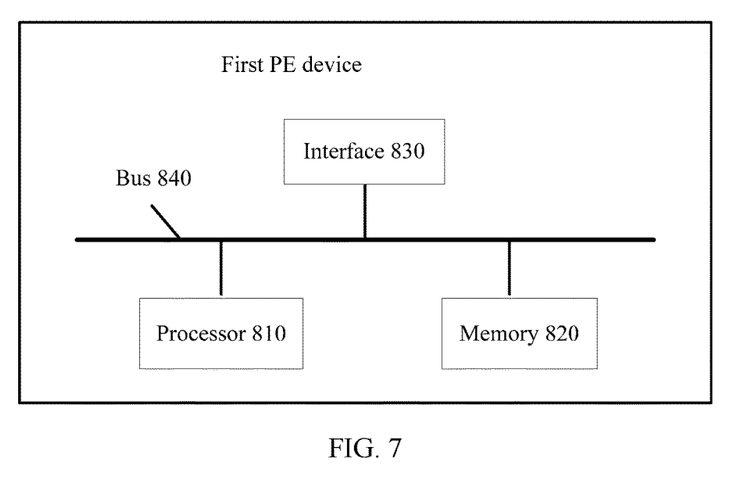
FIG. 7 is a schematic diagram of a first PE device according to an embodiment of the present application.

An embodiment of the present application further provides a first PE device, which is applied to a BGP-based MVPN. As shown in FIG. 7, the first PE device includes a bus 840, a processor 810 connected to the bus 840, a memory 820, and an interface 830, where the memory 820 is configured to store an instruction, and the processor 810 is configured to execute the instruction to perform the following operations:

determining a role of the first PE device in the BGP-based MVPN and a working status corresponding to the role, where the role is a root node and/or a leaf node, and the working status is active or standby;

generating a BGP update message, where the BGP update message carries an IP address of the first PE device, an identifier of the MVPN, and the role of the first PE device and the working status of the first PE device; and triggering the interface 830 to send the BGP update message to a BGP neighbor of the first PE device in the MVPN.

Optionally, that the processor 810 executes the instruction to determine the role of the first PE device in the BGP-based MVPN and the working status corresponding to the role includes: receiving configuration information, where the configuration information is used to specify the role of the first PE device and the working status corresponding to the role; and determining, according to the configuration information, the role of the first PE device and the working status corresponding to the role.

For example, the BGP update message may be actively generated by the first PE device after the first PE device determines the role of the first PE device and the working status of the first PE device, which is hereinafter referred to as manner 1; or may be a response message generated by the first PE device after the first PE device receives a message that carries an S-PMSI A-D route and is sent from a PE device serving as a root node in the MVPN and then processes the message carrying the S-PMSI A-D route, which is hereinafter referred to as manner 2. In manner 2, the first PE device determines that the first PE device is a leaf node in the MVPN. A BGP update message in a BGP-based MVPN protocol includes NLRI, which is referred to as NLRI of a multicast VPN (MCAST-VPN NLRI). For ease of description, in this specification, a BGP update message in manner 1 is referred to as BGP update message A, and a BGP update message in manner 2 is referred to as BGP update message B. NLRI in BGP update message A and that in BGP update message B is respectively referred to as NLRI A and NLRI B.

The following separately describes manner 1 and manner 2.

In manner 1, optionally, NLRI A includes a route type field, an RD field, an originator IP address field, a root role field, a working status field corresponding to the root role field, a leaf role field, and a working status field corresponding to the leaf role field. Content of the route type field in NLRI A identifies that BGP update message A carries the role of the first PE device and the working status of the first PE device; the RD field carries an RD of an instance of the MVPN, where the instance of the MVPN is on the first PE device, and the RD is used as the identifier of the MVPN; the originator IP address field carries the IP address of the first PE device; when the root role field carries a first value, it identifies that the role of the first PE device is the root node; when the working status field corresponding to the root role field carries a second value, it identifies that the working status of the first PE device is the active; when the working status field corresponding to the root role field carries a third value, it identifies that the working status of the first PE device is the standby; when the leaf role field carries a fourth value, it identifies that the role of the first PE device is the leaf node; when the working status field corresponding to the leaf role field carries a fifth value, it identifies that the working status of the first PE device is the active; when the working status field corresponding to the leaf role field carries a sixth value, it identifies that the working status of the first PE device is the standby; where the second value is different from the third value, and the fifth value is different from the sixth value.

In manner 1, optionally, the NLRI further includes a first indication field, and the first indication field is used to indicate whether the NLRI carries a first address field, where the first address field carries an IP address of a second PE device, and the second PE device is an active root node protected by the first PE device in the MVPN. When the processor 810 executes the instruction to determine that the role of the first PE device is the root node and the working status of the first PE device is standby, and the first indication field indicates that the NLRI carries the first address field, the NLRI further includes the first address field; correspondingly, the processor 810 executes the instruction to further perform the following operation: determining the IP address of the second PE device. The NLRI further includes a second indication field, and the second indication field is used to indicate whether the NLRI carries a second address field, where the second address field carries an IP address of a third PE device, and the third PE device is an active leaf node protected by the first PE device in the MVPN. When the processor 810 executes the instruction to determine that the role of the first PE device is the leaf node and the working status of the first PE device is standby, and the second indication field indicates that the NLRI carries the second address field, the NLRI further includes the second address field; correspondingly, the processor 810 executes the instruction to further perform the following operation: determining the IP address of the third PE device.

In manner 2, optionally, the processor 810 executes the instruction to further perform the following operation: receiving, by using the interface 830, a message that carries an S-PMSI A-D route and is sent from a fourth PE device, where the fourth PE device is a root node in the MVPN. BGP update message B is used to respond to the message carrying the S-PMSI A-D route, and BGP update message B includes NLRI B, where NLRI B includes a route type field, a Route Key field, an originator IP address field, and a first working status field. Content of the route type field in NLRI B identifies that the role of the first PE device is the leaf node, and that BGP update message B carries the working status of the first PE device; the Route Key field carries NLRI in the S-PMSI A-D route; the originator IP address field carries the IP address of the first PE device; when the first working status field carries a first value, it identifies that the working status of the first PE device is the active; when the first working status field carries a second value, it identifies that the working status of the first PE device is the standby; where the first value is different from the second value.

In manner 2, optionally, the processor 810 executes the instruction to further perform the following operation: when it is determined that the role of the first PE device is the leaf node and the working status of the first PE device is standby, determining an IP address of a fifth PE device, where the fifth PE device is an active leaf node protected by the first PE device in the MVPN; correspondingly, NLRI B further includes a third address field, where the third address field carries the IP address of the fifth PE device.

According to the technical solution provided in this embodiment of the present application, a PE device in a BGP-based MVPN determines a role of the PE device in the BGP-based MVPN and a working status corresponding to the role, generates a BGP update message, and sends the BGP update message to a BGP neighbor of the PE device in the BGP-based MVPN, where the BGP update message carries an IP address of the PE device, an identifier of the MVPN, the role of the PE device, and the working status corresponding to the role, which may enable the BGP neighbor of the PE device in the same MVPN to automatically obtain the role of the PE device and the working status of the PE device, so that a configuration workload of the MVPN may be lessened and errors may be reduced.

Further, the technical solution provided in this embodiment of the present application overcomes a deficiency that in an existing BGP-based MVPN protocol, a PE device cannot advertise a working status of the PE device, so that the BGP-based MVPN protocol may be combined with a technology of establishing a P2MP tunnel with local protection, because the technology of establishing a P2MP tunnel with local protection requires that a root node learn an active/standby state of each leaf node. For a method for establishing a P2MP tunnel with local protection, refer to a patent application with a publication number US2010-0177631.

A person of ordinary skill in the art may understand that all or some of the steps of the method embodiments may be implemented by a program instructing related hardware. The foregoing program may be stored in a computer readable storage medium. When the program runs, the steps of the method embodiments are performed. The foregoing storage medium may be at least any one of the following mediums: any medium that can store program code, such as a read-only memory (Read-Only Memory, ROM), a RAM, a magnetic disk, or an optical disc.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

Finally, it should be noted that the foregoing embodiments are merely intended for exemplarily describing the technical solutions of the present application other than limiting the present application. Although the present application and benefits of the present application are described in detail with reference to the foregoing embodiments, persons of ordinary skill in the art should understand that they may still make modifications to the technical solutions described in the foregoing embodiments or make equivalent replacements to some technical features thereof, without departing from the scope of the claims of the present application.

What is claimed is:

1. A method for advertising information about a first provider edge (PE) device in a Border Gateway Protocol-based multicast virtual private network (BGP-based MVPN), the method comprising:
    receiving, by the first PE device, configuration information describing a role and a working status of the first PE device as a node in the BGP-based MVPN that supports point-to-multipoint tunneling among nodes forming the BGP-based MVPN;
    generating, by the first PE device, a BGP update message, including network layer reachability information (NLRI) comprising an IP address of the first PE device, an identifier of the BGP-based MVPN, and the role of the first PE device and working status of the first PE device,
        wherein the role of the first PE device in the BGP-based MVPN is at least one of a root node and a leaf node, and the working status is either active or standby;
    determining, by the first PE device, an IP address of an active leaf node in the BGP-based MVPN that is protected by the first PE device when the role of the first PE device is the leaf node and the working status of the first PE device is standby; and
    sending, by the first PE device, the BGP update message in the BGP-based MVPN in a first or second manner, depending on whether the role of the first PE device is a root or leaf node in the BGP-based MVPN,
        wherein the first manner includes sending the BGP update message without prompting by another node in the BGP-based MVPN and the second manner includes sending the BGP message after receiving a message from an active root node in the BGP-based MVPN,
        wherein the BGP update message is sent in the first manner and comprises the IP address of the active leaf node when the first PE device determines that the role of the first PE device is the leaf node and the working status of the first PE device is standby, and
        wherein sending the BGP update message in the first manner comprises (a) first information indicating that the BGP update message carries the role of the first PE device and the working status of the first PE device, (b) a route distinguisher (RD) of an instance of the BGP-based MVPN on the first PE device, and (c) the RD is used as the identifier of the BGP-based MVPN.

2. The method according to claim 1 further comprises:
determining, by the first PE device, an IP address of a second PE device when (a) the second node is an active root node in the BGP-based MVPN protected by the first PE device the (b) first PE device determines it is a root node whose working status is standby; and
sending the BGP update message in the second manner, wherein the BGP update message comprises an IP address of the second PE device.

3. The method according to claim 1 further comprises:
determining, by the first PE device, the role of the first PE device is a leaf node in the BGP-based MVPN and its working status is standby,
determining, by the first PE device, the IP address of an active leaf node in the BGP-based MVPN protected by the first PE device, wherein the BGP update message includes second information including the IP address of the active leaf node protected by the first PE device and the BGP update message is sent in the first manner.

4. The method according to claim 1, wherein receiving the message from the active root node in the BGP-based MVPN before sending the BGP update message in the second manner comprises:
receiving, by the first PE device, the message that carries an S-P-multicast service interface tunnel auto-discovery (S-PMSI A-D) route,
wherein the BGP update message is sent in the second manner and in response to the message carrying the S-PMSI A-D route, and the BGP update message comprises information indicating that (a) the role of the first PE device is the leaf node, and (b) the working status of the first PE device.

5. A first provider edge (PE) device applied to a Border Gateway Protocol-based multicast virtual private network (BGP-based MVPN), the PE device comprising:
a processor configured to provide at least the following operations for advertising information about the first PE device:
receive configuration information describing a role and a working status of the first PE device as a node in the BGP-based MVPN that provides point-to-multipoint tunneling among nodes forming the BGP-based MVPN; and
generate a BGP update message includes network layer reachability information (NLRI) comprising an IP address of the first PE device, an identifier of the BGP-based MVPN, and the role and working status of the first PE device, wherein the role of the first PE device in the BGP-based MVPN is at least one of a root node and a leaf node, and the working status is either active or standby;
determining an IP address of an active leaf node in the BGP-based MVPN that is protected by the first PE device when the role of the first PE device is the leaf node and the working status of the first PE device is standby; and
a network interface configured to cooperate with the processor to send the BGP update message in the BGP-based MVPN in a first or second manner, depending on whether the role of the first PE device is a root or leaf node in the BGP-based MVPN,
wherein the first manner includes sending the BGP update message without prompting by another node in the BGP-based MVPN and the second manner includes sending the BGP message after receiving a message from an active root node in the BGP-based MVPN, wherein the BGP update message is sent in the first manner and comprises the IP address of the active leaf node when the role of the first PE device is the leaf node and the working status of the first PE device is standby, and
wherein sending the BGP update message in the first manner comprises (a) first information indicating that the BGP update message carries the role of the first PE device and the working status of the first PE device, (b) a route distinguisher (RD) of an instance of the BGP-based MVPN on the first PE device, and (c) the RD is used as the identifier of the BGP-based MVPN.

6. The first PE device according to claim 5, wherein the processor is further configured to provide the following operations:
determine an IP address of a second PE device when (a) the second node is an active root node in the BGP-based MVPN protected by the first PE device the (b) first PE device determines it is a root node whose working status is standby; and
send the BGP update message in the second manner, wherein the BGP update message comprises an IP address of the second PE device.

7. The first PE device according to claim 5, further comprising:
a receiver configured to cooperate with the processor to receive a message from the active root node of the BGP-based MVPN that carries an S-P-multicast service interface tunnel auto-discovery (S-PMSI A-D) route,
wherein the BGP update message is sent in the second manner and in response to the message carrying the S-PMSIA-D route, and comprises information indicating that the role of the first PE device is the leaf node, and the working status of the first PE device.

8. The first PE device according to claim 7, where the processor is further configured to:
when the processor determines that the role of the first PE device is the leaf node and the working status of the first PE device is standby, determine an IP address of an active leaf node in the BGP-based MVPN that is protected by the first PE device and the BGP update message is sent in the first manner and further comprises the IP address of the active leaf node.

9. A first provider edge (PE) device in a Border Gateway Protocol-based multicast virtual private network (BGP-based MVPN), the PE device comprising:
a non-transitory memory comprising executable instructions; and
a processor in communication with the memory, wherein when the processor executes the instructions, the processor is configured to provide at least the following operations for advertising information about the first PE device:
receive configuration information describing a role and a working status of the first PE device as a node in the BGP-based MVPN that provides point-to-multipoint tunneling among nodes forming the BGP-based MVPN;
generate a BGP update message that includes network layer reachability information (NLRI) comprising an IP address of the first PE device, an identifier of the BGP-based MVPN, and the role and working status of the first PE device, wherein the role of the first PE device in the BGP-based MVPN is at least one of a root node and a leaf node, and the working status is either active or standby;

determining an IP address of an active leaf node in the BGP-based MVPN that is protected by the first PE device when the role of the first PE device is the leaf node and the working status of the first PE device is standby; and send the BGP update message in the BGP-based MVPN in a first or second manner, depending on whether the role of the first PE device is a root or leaf node in the BGP-based MVPN, wherein the first manner includes sending the BGP update message without prompting by another node in the BGP-based MVPN and the second manner includes sending the BGP message after receiving a message from an active root node in the BGP-based MVPN, wherein the BGP update message is sent in the first manner and comprises the IP address of the active leaf node when the role of the first PE device is the leaf node and the working status of the first PE device is standby, and wherein sending the BGP update message in the first manner comprises (a) first information indicating that the BGP update message carries the role of the first PE device and the working status of the first PE device, (b) a route distinguisher (RD) of an instance of the BGP-based MVPN on the first PE device, and (c) the RD is used as the identifier of the BGP-based MVPN.

10. A non-transitory computer-readable storage medium comprising instructions which, when executed by a computer, cause the computer to carry out the method of claim 1.

11. The non-transitory computer-readable storage medium according to claim 10 further comprises:
(a) determining the role of the first PE device is a root node in the BGP-based MVPN whose working status is standby, (b) determining an IP address of an active root node in the BGP-based MVPN protected by the first PE device, and (c) sending the BGP update message in the second manner, wherein the BGP update message comprises an IP address of the active root node; or
(a) determining the role of the first PE device is a leaf node in the BGP-based MVPN whose working status is standby, (b) determining the IP address of an active leaf node in the BGP-based MVPN protected by the first PE device, and (c) sending the BGP update message in the second manner, wherein the BGP update message comprises an IP address of the active leaf node.

12. The non-transitory computer-readable storage medium according to claim 10, wherein receiving the message from the active node in the BGP-based MVPN before sending the BGP update message in the second manner comprises:
receiving, by the first PE device, the message that carries an S-P-multicast service interface tunnel auto-discovery (S-PMSI A-D) route,
wherein the BGP update message is sent in the second manner and in response to the message carrying the S-PMSI A-D route, and the BGP update message comprises information indicating that (a) the role of the first PE device is the leaf node, and (b) the working status of the first PE device.

13. The first provider edge (PE) device according to claim 9, wherein the processor is further configured to:
determine an IP address of a second PE device when (a) the second node is an active root node in the BGP-based MVPN protected by the first PE device and the (b) first PE device determines it is a root node whose working status is standby; and
send the BGP update message in the second manner, wherein the BGP update message comprises an IP address of the second PE device; or
determine the role of the first PE device is a leaf node in the BGP-based MVPN and its working status is standby; and
determine an IP address of an active leaf node in the BGP-based MVPN protected by the first PE device, wherein the BGP update message (a) includes second information that includes the IP address of the active leaf node protected by the first PE device and (b) is sent in the second manner.

14. The first provider edge (PE) device according to claim 9, wherein the processor is further configured to:
receive the message from the active node in the BGP-based MVPN before sending the BGP update message in the second manner comprises:
receive the message that carries an S-P-multicast service interface tunnel auto-discovery (S-PMSI A-D) route, wherein the BGP update message is sent in the second manner and in response to the message carrying the S-PMSI A-D route, and the BGP update message comprises information indicating that (a) the role of the first PE device is the leaf node, and (b) the working status of the first PE device.

* * * * *